(12) United States Patent
Alcântara et al.

(10) Patent No.: US 11,864,968 B2
(45) Date of Patent: Jan. 9, 2024

(54) SYSTEM FOR INSERTION INTO THE ROOT CANAL, METHOD FOR OBTAINING A FASTENING ELEMENT USING SAID SYSTEM AND FASTENING ELEMENT

(71) Applicant: ANGELUS INDUSTRIA DE PRODUTOS ODONTOLOGICOS S/A, Londrina (BR)

(72) Inventors: Roberto Queiróz Martins Alcântara, Londrina (BR); Guilherme Guedes Moreno, Londrina (BR); Eduardo Lima Costa, Londrina (BR)

(73) Assignee: ANGELUS INDUSTRIA DE PRODUTOS ODONTOLOGICOS S/A, Londrina (BR)

(*) Notice: Subject to any disclaimer, the term of this patent is extended or adjusted under 35 U.S.C. 154(b) by 623 days.

(21) Appl. No.: 16/999,477

(22) Filed: Aug. 21, 2020

(65) Prior Publication Data
US 2022/0054229 A1 Feb. 24, 2022

(51) Int. Cl.
*A61C 5/35* (2017.01)
*A61C 5/70* (2017.01)
*A61C 8/00* (2006.01)

(52) U.S. Cl.
CPC .............. *A61C 5/35* (2017.02); *A61C 5/70* (2017.02); *A61C 8/0016* (2013.01); *A61C 8/0063* (2013.01)

(58) Field of Classification Search
CPC .... A61C 5/35; A61C 5/70; A61C 5/50; A61C 8/0016; A61C 8/0063; A61C 13/30
USPC ....................................................... 433/220
See application file for complete search history.

(56) References Cited

U.S. PATENT DOCUMENTS

| | | | | | |
|---|---|---|---|---|---|
| 4,253,835 A | * | 3/1981 | Ware | ...................... | A61C 13/30 264/16 |
| 4,622,012 A | * | 11/1986 | Smoler | .................. | A61C 13/30 433/221 |
| 5,165,893 A | * | 11/1992 | Thompson | ............... | A61C 5/50 433/81 |
| 5,326,263 A | * | 7/1994 | Weissman | ................ | A61C 5/50 433/221 |
| 5,816,816 A | * | 10/1998 | Scharf | .................... | A61C 13/30 433/215 |
| 6,183,253 B1 | * | 2/2001 | Billet | ..................... | A61C 13/30 433/81 |
| 7,828,550 B2 | * | 11/2010 | Wagner | .................... | A61C 5/50 433/224 |
| 10,426,573 B2 | * | 10/2019 | Levin | ................. | A61C 13/0018 |

(Continued)

FOREIGN PATENT DOCUMENTS

| | | |
|---|---|---|
| EP | 0809475 B1 | 12/2000 |
| EP | 1925269 A1 | 5/2008 |
| WO | 2002030647 A2 | 4/2002 |

*Primary Examiner* — Matthew M Nelson
(74) *Attorney, Agent, or Firm* — Quarles & Brady LLP

(57) ABSTRACT

The present invention is related to the dentistry field. More precisely, the present invention relates to a system for insertion into the root canal for obtaining a root fastening element to support crowns comprising a sleeve of flexible and moldable material, non-adherent to the walls of the root canal, wherein the sleeve comprises a root section and a crown section which are filled with fibers in different arrangements. In addition, the present invention is related to a method for obtaining a fastening element using the system and root fastening element to support crowns.

11 Claims, 3 Drawing Sheets

(56) References Cited

U.S. PATENT DOCUMENTS

| | | | |
|---|---|---|---|
| 2006/0208393 A1* | 9/2006 | Karmaker | A61K 6/887 |
| | | | 264/319 |
| 2008/0124682 A1* | 5/2008 | Nordin | A61C 5/42 |
| | | | 433/220 |
| 2009/0092950 A1* | 4/2009 | Machado | A61C 5/35 |
| | | | 433/225 |
| 2014/0147815 A1* | 5/2014 | Sicurelli | A61C 13/30 |
| | | | 433/220 |
| 2019/0282346 A1* | 9/2019 | Maneuf | A61C 5/50 |
| 2022/0054229 A1* | 2/2022 | Alcântara | A61C 5/50 |

* cited by examiner

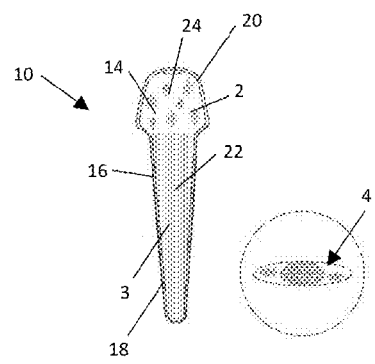
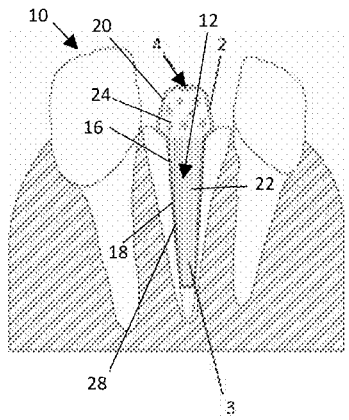
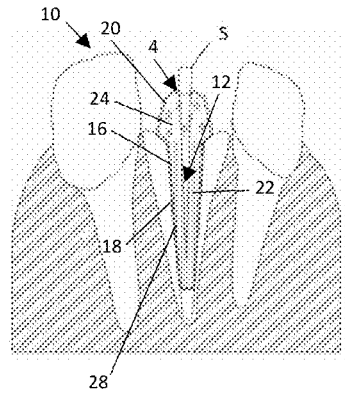
Fig. 3A    Fig. 3B    Fig. 3C
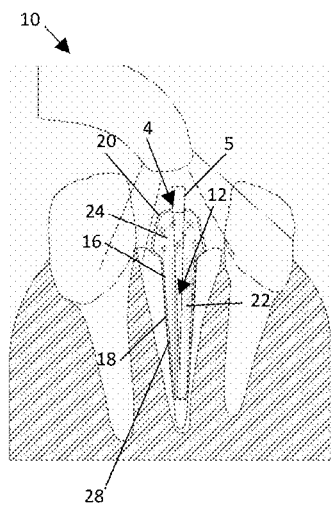
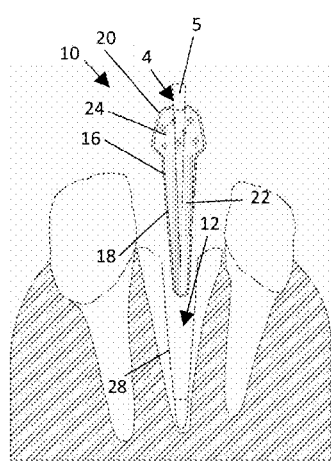
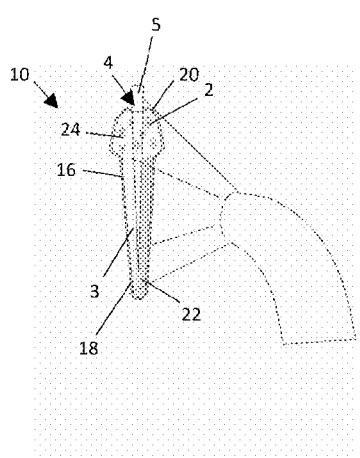
Fig. 3D    Fig. 3E    Fig. 3F
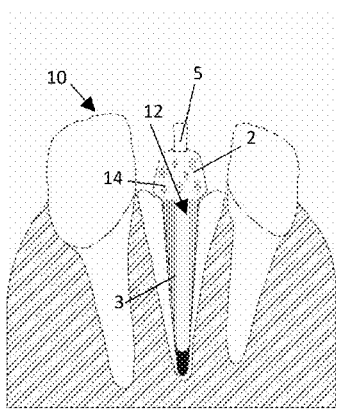
Fig. 3G

SYSTEM FOR INSERTION INTO THE ROOT CANAL, METHOD FOR OBTAINING A FASTENING ELEMENT USING SAID SYSTEM AND FASTENING ELEMENT

FIELD OF THE INVENTION

The present invention is related to the dentistry field. More precisely, the present invention relates to a system for insertion into the root canal for obtaining a root fastening element to support crowns comprising a sleeve that is flexible and non-adherent to the walls of the root canal, wherein the flexible sleeve comprises a root section and a crown section which are filled with fibers in different arrangements. In addition, the present invention is related to a method for obtaining a fastening element using said system and root fastening element to support crowns.

BACKGROUND OF THE INVENTION

Pins used in teeth after root canal treatment, to reinforce the root and/or for anchoring prostheses to be installed on the roots of the teeth, are normally produced by two methods.

The first method is performed directly on the roots, wherein the dentist uses a resin to produce a dental core (pin+crown section) that mimics the entire shape and diameter of the internal canal, wherein the core obtained by the dentist is sent to the lab to be casted in metal by the casting process called "lost wax".

FIG. 1A shows the insertion of a state-of-the-art plastic pin. FIG. 1B shows a filling of a canal with resin. FIG. 1C shows the filling of an upper part of the canal with resin and FIG. 1D shows the final shape after the sculpture using drills. The final piece of FIG. 1D is removed from the tooth and sent to a laboratory that fuses this plastic piece into metal, transforming it into a metallic piece commonly called casted metal-core.

The second method is the use of pre-manufactured pins in metal or fibers (most commonly glass fibers), as shown in FIG. 2. In these cases, the cores (named in this document as fastening elements) are obtained with cementation of the pins directly inside the canal followed by the manufacture of the crown section with resins, without the need for the laboratory phase required in the case of casted metal cores.

The pre-manufactured fiber pins have the advantage of not being corroded like metallic pins, thus, not causing their early loss, in addition to not causing a metallic taste in the patient's mouth. Additionally, these pre-manufactured fiber pins have an elasticity modulus (flexibility) of approximately 18 GPa, similar to that of dentin in the crown section which is about 20 GPa and in the root section which is from 9 GPa to 10 GPa. This flexibility of the fiber pins minimizes the risk of root fractures where they are installed, since in the case of excessive force on them, they undergo a flexion, absorbing the shocks, not transferring them to the root.

In cases of excessive force on the metal pins, whether they are pre-manufactured or casted in metal, as they do not undergo flexion, like fiber pins, they transfer the received force to the tooth, causing fractures in the roots and, therefore, tooth loss.

In addition, pre-manufactured fiber pins can be made in white, as is the case with fiberglass pins, allowing the professional to manufacture more aesthetic prostheses and being more accepted by the patient.

However, although the pre-manufactured pins are produced in a range of diameter close to those of the treated canals, these have the disadvantage of not adapting perfectly to all the diameters of the canals. As a result of this partial adaptation, the pre-manufactured fiber pins lose part of their retentive capacity, being able to move from the root after they are cemented in the canal. This displacement can cause the dentist to lose the prosthesis performed on this pin.

Another major disadvantage of the pre-manufactured fiberglass pin is that the crown section is built in the composite resin that has low mechanical strength to withstand the mastication loads that are applied thereon.

In this sense, several proposals were submitted in order to solve the lack of a good adaptation of the pre-manufactured pins in the root section and the increase of the mechanical strength of the crown section.

European patent EP 1 925 269, granted on Nov. 18, 2009, on behalf of HARALD E. NORDIN and PETER NORDIN, and entitled "Tooth root channel anchorage assembly" describes a hollow structure to be positioned above the root, i.e., on the pre-manufactured pin already installed, having, therefore, the sole function of providing a supra-structure on the pre-manufactured pin to support the prosthesis.

European patent EP 1 925 269 differs from the present invention since it aims to provide higher retentivity only of the "crown element" when the pin is positioned within the canal. The present invention, on the other hand, presents the root fastening element together with the pin, internally positioned to the channel.

North-American Patent U.S. Pat. No. 5,816,816, granted on Oct. 6, 1998 on behalf of PRACTICON INC, and entitled: "Method of producing fiber reinforced dental post and resulting dental post" describes a process for making a pin to be installed in the root canal, aiming to support the future prosthesis to be installed on it. It uses a closed braided fiber rope, in its lower portion, which should receive a hollow mandrel and, in the sequence, positioned inside the canal. Then, a needle is fitted into the hollow mandrel, and resin is injected and, at the same time, the mandrel is removed from the canal. The "rope-mandrel" set now filled with resin becomes a pin to support the future prosthesis.

It is important to note that the pin obtained by North-American Patent U.S. Pat. No. 5,816,816 will behave just like a conventional pin already known from the prior art, differing only in the manufacturing process. Although the system has a hollow fastening element in the form of a rope that will be filled with resin, it has no similarity with the present invention, whose purpose of the elements that involve the pin is to promote a greater anatomical conformation of the system installed in the root canal.

European patent EP 0 809 475, granted on Dec. 1, 2000, on behalf of SOCIETE DE RECHERCHES TECHNIQUES DENTAIRES R.TD, entitled "Self-locking Dental Post" describes a process for obtaining a pin to be inserted into the canal to support the future prosthesis to be positioned on it. The process of said patent comprises a rigid element in its central part and an uncured material on the external part, which, when positioned inside the canal, shapes the walls of the same, being then cured to remain fastened within the canal. The problem with this technique is that it does not allow the total polymerization of the prosthetic element inside the prepared root canal, nor does it allow the removal of the canal element for final polymerization, which leaves the pin fragile due to incomplete polymerization.

In the present invention, unlike document EP 0 809 475, one of its elements comprises a flexible sleeve that serves as an insulator to prevent the system from adhering to the walls of the canal, thus allowing its removal in order to complete its polymerization outside the canal, which guarantees a final strength that is suitable for use.

North-American Patent U.S. Pat. No. 5,326,263, granted on Jul. 5, 1994, on behalf of BERNARD WEISSMAN, and entitled: "Light-curable tooth reinforcement" describes the insertion of a flexible pin into the canal, which is then filled with an uncured resin that will occupy the empty spaces between the pin and the walls of the canal. Then, partial curing of the resin is performed, followed by removal of the set from the canal and final curing. As a result, a pin conforming to the canal structures is obtained.

North-American Patent U.S. Pat. No. 5,326,263 described above affirms the possibility of removing the set for final polymerization outside the canal, but it is known that, in practice, the removal of this set is a complex procedure, with imminent risks of failure due to its adhesion to the walls of the canal. In this regard, the Patent U.S. Pat. No. 5,326,263 differs from the present invention in that it contains the sleeve of flexible material that prevents the adhesion of the set (polymerized fibers) to the walls of the canal, allowing the removal of the set for final polymerization.

North-American patent U.S. Pat. No. 6,183,253, granted on Feb. 6, 2001, on behalf of BILLET GILLES, et. al, and entitled: "Endodontic insert pre-impregnated with reinforcing fibers for filling the dental canal" discloses a set wherein a ductile core is coated with one or more concentric sleeve pre-impregnated with resins that allow it to assume malleable and anatomical functions before and during insertion into the root canal for further polymerization. This patent provides for the use of the same material to fill the root canal and reinforce the remaining tooth structures. In addition, it is described that the core and the sleeve are arranged according to the orientation of the fibers, and the volume of the set is changed by compression applied at the time of insertion into the canal.

This patent has differences over the present invention, due to the necessary use of a pre-manufactured core and the impossibility of removing the set from the canal for final photo-polymerization.

North-American Patent U.S. Pat. No. 10,426,573, granted on Oct. 1, 2019, on behalf of MARTIN DAVID LEVIN, entitled "Customized root canal obturation colors and methods of making customized root canal obturation cores" describes a single piece core with pre-manufactured contours seeking to approximate the contour presented by the root canal. The core can be used with or without sealing material and, for customized obturation, three-dimensional images should be used for a better combination between the pre-manufactured pins and the contours of the canal.

North-American Patent U.S. Pat. No. 10,426,573 differs from the present invention in that there are no elements that promote anatomical conformation to the root canal in a single step, requiring the use of auxiliary imaging systems, as described. It should also be noted that the patent in question does not include systems based on any type of fibers and their arrangements.

North-American Patent U.S. Pat. No. 5,165,893, granted on Nov. 24, 1992, on behalf of RONALD A. THOMPSON, and entitled: "Method and device for filling and sealing root canals of teeth" describes a method for filling and sealing root canals, also, to provide a device for the realization of the method. The device comprises a coating of non-rigid, flexible and expandable material, which conforms to the contours of the walls of the root canal after insertion, having a coating of a sealer or bonding material on its external surface, which adheres to the dentin of the root canal system when the coating is expanded or inflated.

North-American Patent U.S. Pat. No. 5,165,893 differs from the present invention because it does not provide the removal of the coating material, and does not include systems based on any type of fibers and their arrangements, as well as cannot be used for fastening pins and crowns.

International publication WO/2002/030647, published on Apr. 18, 2002, on behalf of CARBOTECH entitled "Composite materials, method for making same and uses thereof" describes a composite material composed of pre-impregnated fibers, inserted in a sealed sheath system for containment, manipulation, moldability and formation of different systems after curing, such as, for example, the dental prosthetic.

Publication WO/2002/030647 differs from the present invention since it indicates the presence of pre-impregnated fibers in a single way layout and does not mention the possibility of concomitant use of pre-manufactured pins during application in crown and/or root prosthetic systems, as well as not foresee the application of curing of the composite in two stages.

Thus, as can be seen, none of the documents mentioned above proposes a system for insertion into the root canal composed of a sleeve of flexible and moldable material, non-adherent to the walls of the root canal, with root and crown sections, filled with reinforcement materials in different arrangements for making a root fastening element to support crowns.

Finally, since it comprises a sleeve, the present invention makes it possible to remove the system from the root canal to complete the polymerization externally to the canal, which is not the case in any of the cited prior art documents. It is important to emphasize that the current polymerization systems do not allow the complete polymerization of uncured composite systems within the canal.

SUMMARY OF THE INVENTION

To solve the abovementioned problems, the present invention will provide significant advantages over the systems for insertion into a root canal to obtain a root fastening element to support crowns.

It is an object of the present invention to provide a system for insertion into the root canal to obtain a root fastening element to support crowns comprising a flexible sleeve, wherein the flexible sleeve comprises a root section with shape and diameters approximately equal to a root canal lumen with a central lumen in a conical or parallel shape, and a crown section with a slightly smaller shape of a teeth crown to be used. The root section of the flexible sleeve is filled with longitudinal/unidirectional fibers positioned parallel to its length and impregnated with uncured polymeric matrix. The crown section of the flexible sleeve is filled with chopped fibers, or fibers in the form of blankets or fabrics multi-directionally arranged and impregnated with an uncured polymeric matrix.

In addition, the present invention provides a method for obtaining a root fastening element to support crowns using the system for insertion into a root canal. The method includes filling the flexible sleeve of the system for insertion into the canal with fibers and polymeric matrix, inserting the flexible sleeve filled with fibers and polymeric matrix in the root canal, pre-polymerizing the system for insertion into the canal in the root canal, removing the system for insertion into the pre-polymerized root canal of the root canal, final polymerizing of the system outside the root canal, and removing the flexible sleeve from the system, forming the root fastening element to support crowns.

Furthermore, the present invention provides a root fastening element to support crowns obtained by the proposed method.

BRIEF DESCRIPTION OF THE DRAWINGS

The structure and use of the present invention, together with its additional advantages, can be better understood by reference to the attached drawings and the following description:

FIG. 3A shows a preferred embodiment of the system for insertion into the root canal of the present invention showing the sleeve with the longitudinal fibers and the multidirectional fibers.

FIG. 3B shows a preferred embodiment of the system for insertion into the root canal of the present invention properly positioned within the root canal.

FIG. 3C shows a preferred embodiment of the system for insertion into the root canal of the present invention, wherein a pre-manufactured pin is inserted among the fibers.

FIG. 3D shows the light pre-polymerization of the system of the present invention.

FIG. 3E shows the removal of the system of the present invention from within the canal after performing the pre-polymerization (within the canal) of fibers impregnated with resin.

FIG. 3F shows the final polymerization procedure of the system for insertion into the root canal of the present invention outside the root canal, which can be performed with or without the containment sleeve.

FIG. 3G shows the system for insertion into the root canal of the present invention, without the sleeve, cemented within the root canal.

DETAILED DESCRIPTION OF THE INVENTION

Although the present invention can be presented in different embodiments, the present details accompanied by the drawings, indicate a preferred embodiment, emphasizing that it should be considered as an example of the principle of the present invention and not a limitation.

Figure 1A:
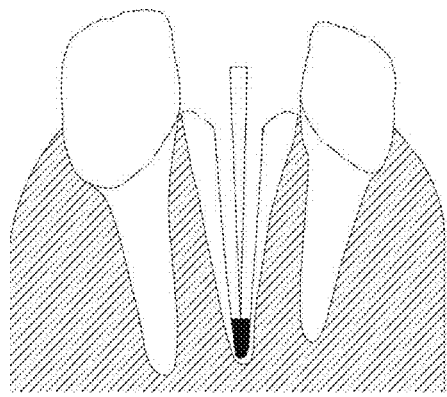
FIG. 1A shows the insertion of a plastic pin into the root canal as known from the prior art.
Figure 1B:
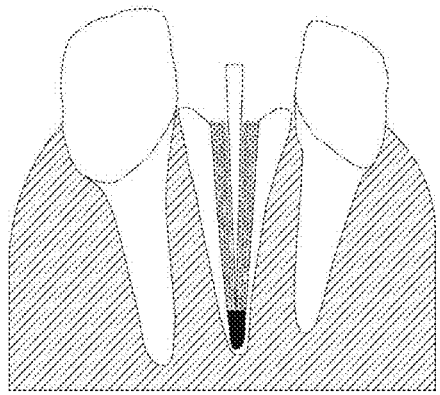
FIG. 1B shows the filling of the root canal with resin as known from the prior art.
Figure 1C:
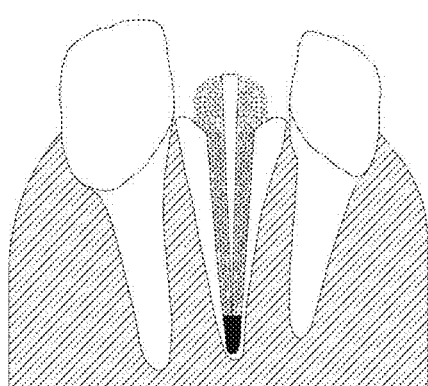
FIG. 1C shows the filling of the upper part of the root canal with resin as known from the prior art.
Figure 1D:
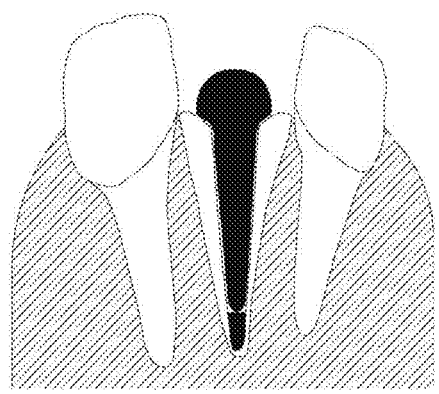
FIG. 1D shows the final shape of the fastening element after sculpting using drills as known from the prior art.
Figure 2:
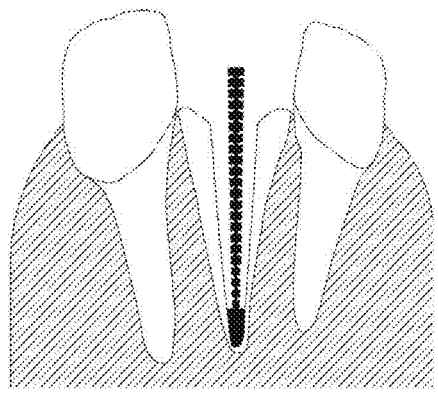
FIG. 2 shows the use of pre-manufactured pins made of metal or fibers according to the second prior art method described above.
Figure 4:
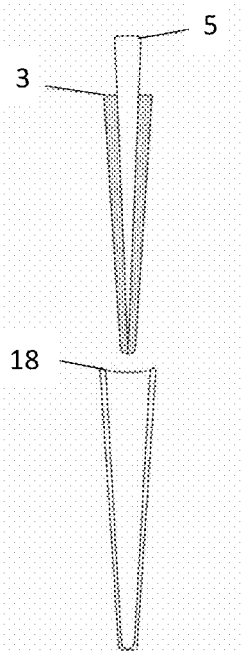
FIG. 4 shows the root section of the sleeve of the system of the present invention.
Figure 5:
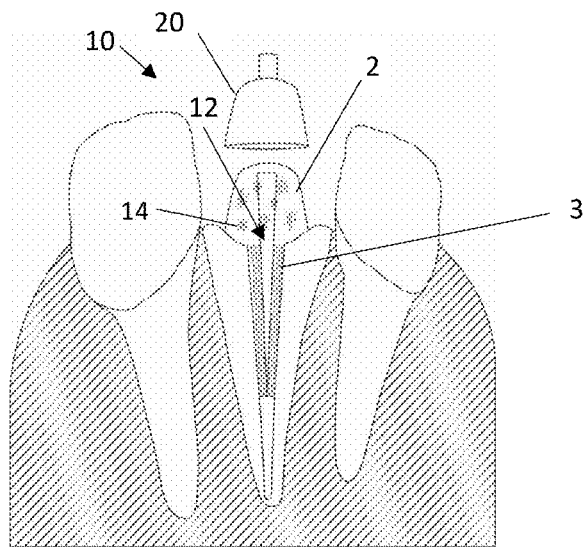
FIG. 5 shows the crown section of the sleeve of the system of the present invention.
Figure 6:
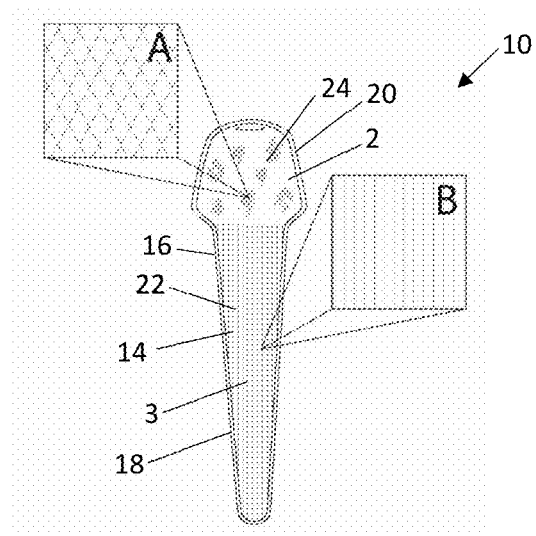
FIG. 6 shows in detail the filling of the root and crown sections with fibers in multidirectional and parallel directions.

As shown by FIGS. 3A to 3G and FIGS. 4 and 5, in a preferred embodiment, the present invention discloses a system 10, such as a fiber system, configured for insertion into a root canal 12 (see, e.g., FIG. 3B) to obtain a root fastening element 14 to support crowns. The system 10 may comprise a flexible sleeve 16, wherein the flexible sleeve comprises two sections: a root canal section 18 and a crown section 20. The flexible sleeve 16 may be configured to receive fibers, such as fibers 22, 24. The root canal section 18 may have a shape and diameter approximately equal to a root canal lumen with a central lumen in a conical or parallel shape, preferably 5 mm to 25 mm long, and walls having a thickness preferably from 0.1 mm to 0.5 mm. The crown section 20 may have a shape slightly smaller than the teeth crown to be used, the crown section 20 having walls with a thickness preferably from 0.1 mm to 0.5 mm.

Regarding the filling of the fiber system 10, it is highlighted that the crown section 20 and the root section 18 are arranged differently from the fibers 22, 24, in order to better withstand the various forces of mastication process, increasing the strength of the root fastening element 14 obtained by the system of the present invention.

Referring to FIG. 3A, the root section 18 of the flexible sleeve 16 is preferably filled with longitudinal/unidirectional fibers 22 positioned parallel to its length and impregnated with an uncured polymeric matrix (resin). The crown section 20 of the flexible sleeve 16 is preferably filled with chopped fibers 24, or fibers in the form of blankets or fabrics multi-directionally arranged and impregnated with an uncured polymeric matrix (resin).

The fibers of the crown section can be chopped, multidirectional, random, continuous, non-continuous, braided, interlaced, or other forms of arrangement, impregnated in a polymeric matrix.

The flexible sleeve is made of one or more polymeric materials, such as, e.g., polyolefins, polyvinyl chloride, polyethylene, polypropylene, silicones, silicone rubbers, or mixtures thereof.

The fibers used to fill the sleeve are fibers selected from the group comprising glass, quartz, carbon, polyamide, aramid fibers and/or mixtures thereof. In some embodiments, glass and/or quartz fibers may be preferred, with fiber filling varying from 30% to 80% of fiber volume relative to the total of fibers and polymeric matrix. That is, the fibers may occupy 30% to 80% of the total volume occupied by a combination of the fibers and the polymeric matrix.

The polymeric matrix used in the impregnation of the fibers in the flexible sleeve is preferably a BIS-GMA resin-based polymeric matrix. In some embodiments, however, the polymeric matrix may include polyamides, polyesters, polyolefins, polyimides, polyacrylates, polyurethanes, vinyl esters, epoxy-based materials, such as epoxy resin, styrene, styrene-acrylonitrile, polymers of ABS, polysulfones, polyacetals, polycarbonates, polyphenylene sulfides, acrylic monomers, methacrylic monomers, or mixtures thereof. The polymeric matrix is based on chemical cure, thermal cure, physical cure, or combinations thereof.

In the flexible sleeve, the union between the fiber and the polymeric matrix forms a reinforced composite. Said reinforced composite of the fastening system may also contain radiopacifier and dispersed pigments in the polymeric matrix, the radiopacifier and pigments being one or more elements, such as, e.g., silica, calcium phosphate, barium sulfate, alumina, zirconia, tin oxide, tantalum oxide, niobium oxide, titanium oxide, poly (methacrylate), and mixtures thereof.

Referring particularly to FIGS. 3D and 3E, the sleeve 16 allows insulation and containment of the fibers 22, 24, in order to avoid direct contact with canal walls 28 of the root canal 12, providing the removal of the system 10 for a final polymerization before obtaining the root fastening element 14 to support crowns.

Considering that the root canal has different diameters and conicities, the flexible sleeve 16 provides that, when positioned in the root canal 12, the system 10 for insertion into the root canal containing non-polymerized fibers will adapt to the walls of the conduit by anatomically juxtaposing to it.

The presence of the flexible-material sleeve will act as an insulating element, not allowing the adhesion of fibers and resins to the walls of the root canal, which after pre-curing, allows the system for insertion into the root canal of the present invention, to be susceptible to removal to a final polymerization outside the conduit, to obtain the root fastening element to support crowns.

Referring to FIG. 3C, in an elective embodiment, one or more pre-manufactured pins 5, rigid or semi-rigid, composite or non-composite, can be introduced into the root canal, inside the composite, before the polymerization of the fibers inside the root canal. For example, the pin 5 may be configured for insertion through opening 4 in the flexible sleeve 16.

The use of one or more pre-manufactured pins 5 aims at strengthening the root and/or anchoring prostheses to be installed on the tooth, further increasing the strength of the root fastening element to support crowns.

Said pre-manufactured pins 5 can have different diameters, conicities, and shapes, which, when used in conjunction with the present invention, allow conformity to any canal size, since it mechanically forces the non-polymerized fibers against the canal walls.

In this context, the system for insertion into the root canal described in the present invention makes it possible to obtain a complete crown, root, or crown-root fastening element, that is, obtain a fastening element (core) with a crown section and root section, simultaneously or separately.

In addition, the present invention provides a method for obtaining a root fastening element to support crowns using the system for insertion into the root canal comprising the following steps, as shown in FIGS. 3D to 3G:

filling the flexible sleeve 16 of the system 10 for insertion into the root canal 12 with fibers 22, 24 and polymeric matrix;
inserting the flexible sleeve 16 filled with fibers 22, 24 and polymeric matrix into the root canal 12;
pre-polymerizing the system 10 in the root canal 12;
removing the system 10 from the root canal 12;
final polymerizing the system 10 outside the root canal 12; and
removing the flexible sleeve 16 from the system 10, forming the root fastening element 14 to support crowns.

The polymerization can be a light cure, chemical cure, or dual (light and chemical) polymerization.

Furthermore, the present invention provides a root fastening element 12 to support crowns comprising a root section 3, a crown section 2 or a complete crown-root section, comprising an opening 4 (see, e.g., FIGS. 3A and 3B). In some embodiments, the opening may be defined by the root fastening element 12 and may be configured to receive pre-manufactured pin 5.

The root fastening element 12 to support crowns of the present invention has a flexural strength which is in the range of 300 Mpa to 1800 Mpa.

Referring to FIG. 3B, the root fastening element will be tangentially fastened to an inner wall 28 of the root canal 12 by means of thermal, chemical, physical cure cements, or a combination thereof.

Thus, although only some embodiments of the present invention have been shown, it will be understood that different omissions, substitutions, and alterations of the fastening system for insertion into the root canal can be made by a person skilled in the art, without departing from the spirit and scope of the present invention.

It is expressly provided that all combinations of elements that perform the same function in substantially the same way to achieve the same results are within the scope of the present invention. Substitutions of elements from one embodiment to another are also fully intended and contemplated.

It is also necessary to understand that the drawings are not necessarily to scale, but that they are only conceptual.

The invention claimed is:

1. A system for insertion into a root canal for obtaining a fastening element to support crowns, the system comprising:
a flexible sleeve, wherein the flexible sleeve comprises a root section with shape and diameters approximately equal to a root canal lumen, the root canal lumen having a central lumen in a conical or parallel shape, and a crown section with a slightly smaller shape of a tooth crown to be used,
wherein the root section of the flexible sleeve is filled with longitudinal or unidirectional fibers positioned parallel to its length and impregnated with uncured polymeric matrix, and
wherein the crown section of the flexible sleeve is filled with chopped fibers, or fibers in the form of blankets or fabrics multi-directionally arranged and impregnated with an uncured polymeric matrix, through an opening.

2. The system of claim 1, wherein the flexible sleeve is produced from a polymeric material including polyolefins, polyvinyl chloride, polyethylene, polypropylenes, silicones, silicone rubbers, or mixtures thereof.

3. The system of claim 1, wherein the fibers used to fill the sleeve include glass, quartz, carbon, polyamide, aramid fibers, or a mixture thereof, and wherein the fibers occupy 30% to 80% of a volume occupied by a combination of the fibers and polymeric matrix.

4. The system of claim 1, wherein the fibers used to fill the sleeve include glass, quartz, or a combination thereof, and wherein the fibers occupy 30% to 80% of a volume occupied by a combination of the fibers and polymeric matrix.

5. The system of claim 1, wherein the polymeric matrix used to impregnate the fibers in the flexible sleeve includes resins of polyamides, polyesters, polyolefins, polyimides, polyacrylates, polyurethanes, vinyl esters, epoxy-based materials, such as epoxy resin, styrene, styrene-acrylonitrile, polymers of ABS, polysulfones, polyacetals, polycarbonates, polyphenylene sulfides, acrylic monomers, methacrylic monomers, or mixtures thereof.

6. The system of claim 5, wherein the polymeric matrix is based on chemical cure, thermal cure, physical cure, or a combination thereof.

7. The system of claim 5, wherein the polymeric matrix used to impregnate the fibers in the flexible sleeve includes BIS-GMA resin.

8. The system of claim 7, wherein the polymeric matrix is based on chemical cure, thermal cure, physical cure, or a combination thereof.

9. The system of claim 1, wherein, in the flexible sleeve, a union between the fiber and the polymeric matrix forms a reinforced composite.

10. The system of claim 9, wherein the reinforced composite contains radiopacifier and dispersed pigments in the polymeric matrix, the radiopacifier, and pigments including silica, calcium phosphate, barium sulfate, alumina, zirconia, tin oxide, tantalum oxide, niobium oxide, titanium oxide, poly (methacrylate), or mixtures thereof.

11. The system of claim 9, further comprising one or more pre-manufactured pins, rigid or semi-rigid, composite or non-composite, to be inserted within the reinforced composite in the flexible sleeve, before a polymerization of the fibers inside the root canal.

\* \* \* \* \*